(12) United States Patent
Hiruma

(10) Patent No.: US 10,921,776 B2
(45) Date of Patent: Feb. 16, 2021

(54) LOG COLLECTING DEVICE, INDUSTRIAL ROBOT, AND ELECTRIC-POWERED PRESS

(71) Applicant: JANOME SEWING MACHINE CO., LTD., Tokyo (JP)

(72) Inventor: Kenichiro Hiruma, Tokyo (JP)

(73) Assignee: JANOME SEWING MACHINE CO., LTD., Tokyo (JP)

( * ) Notice: Subject to any disclaimer, the term of this patent is extended or adjusted under 35 U.S.C. 154(b) by 86 days.

(21) Appl. No.: 16/309,268

(22) PCT Filed: Feb. 9, 2017

(86) PCT No.: PCT/JP2017/004817
§ 371 (c)(1),
(2) Date: Dec. 12, 2018

(87) PCT Pub. No.: WO2017/221452
PCT Pub. Date: Dec. 28, 2017

(65) Prior Publication Data
US 2019/0310606 A1 Oct. 10, 2019

(30) Foreign Application Priority Data
Jun. 24, 2016 (JP) ................... 2016-125894

(51) Int. Cl.
*G05B 19/406* (2006.01)
*G06F 3/06* (2006.01)
(Continued)

(52) U.S. Cl.
CPC ............ *G05B 19/406* (2013.01); *B25J 13/00* (2013.01); *B30B 15/00* (2013.01); *G05B 19/418* (2013.01);
(Continued)

(58) Field of Classification Search
CPC .... G05B 19/406; G05B 23/02; G05B 19/418; G06F 3/0673; G06F 3/0653; G06F 3/0604
See application file for complete search history.

(56) References Cited

U.S. PATENT DOCUMENTS

2004/0039809 A1* 2/2004 Ranous ................... H04L 67/22
709/223
2005/0210477 A1* 9/2005 Auerbach .............. G06Q 30/02
719/315
(Continued)

FOREIGN PATENT DOCUMENTS

CN 102646028 A 8/2012
CN 104423896 A 3/2015
(Continued)

OTHER PUBLICATIONS

Office Action dated Apr. 20, 2020 issued in corresponding Japanese Application No. 2016-125894.
(Continued)

*Primary Examiner* — Vincent H Tran
(74) *Attorney, Agent, or Firm* — Nath, Goldberg & Meyer; Jerald L. Meyer

(57) ABSTRACT

A log collecting device enabling a grasp of an actuation status based on event logs without a restriction regarding a memory, and an industrial robot and an electric-powered press including the same are provided. A log collecting device 1 is provided on, for example, an industrial robot and an electric-powered press, stores an event log 11 indicating details of an event occurred at an apparatus in a volatile memory 3, creates the collection data 12 that is a collection of the event logs 11, stores this collection data 12 in the volatile memory 3, and deletes the event logs 11 collected as the collection data 12 from the volatile memory 3.

9 Claims, 19 Drawing Sheets

(51) Int. Cl.
  *G05B 23/02* (2006.01)
  *G05B 19/418* (2006.01)
  *B25J 13/00* (2006.01)
  *B30B 15/00* (2006.01)

(52) U.S. Cl.
  CPC .......... *G05B 23/02* (2013.01); *G06F 3/0604* (2013.01); *G06F 3/0653* (2013.01); *G06F 3/0673* (2013.01); *G05B 2219/31402* (2013.01); *Y02P 90/02* (2015.11)

(56) References Cited

U.S. PATENT DOCUMENTS

| | | | | |
|---|---|---|---|---|
| 2006/0191993 | A1* | 8/2006 | Markham | G06Q 10/00 235/376 |
| 2007/0038889 | A1* | 2/2007 | Wiggins | G05B 23/0264 714/20 |
| 2015/0039118 | A1* | 2/2015 | Samantaray | G05B 19/41875 700/110 |
| 2016/0171055 | A1* | 6/2016 | Erickson | G06F 11/30 707/723 |
| 2017/0147470 | A1* | 5/2017 | Bloching | G06F 3/0619 |

FOREIGN PATENT DOCUMENTS

| | | |
|---|---|---|
| DE | 102014102844 A1 | 9/2014 |
| JP | 10-275101 A | 10/1998 |
| JP | 2005-209115 A | 8/2005 |
| JP | 2009-009213 A | 1/2009 |
| JP | 2011138309 A | 7/2011 |
| JP | 2011-163262 A | 8/2011 |
| JP | 2014229247 A | 12/2014 |
| JP | 2015108990 A | 6/2015 |
| WO | 2016079972 A1 | 5/2016 |

OTHER PUBLICATIONS

Office Action from corresponding Korean application No. 10-2018-7033721 dated Apr. 28, 2020 with English translation.
Chinese Office Action dated Dec. 4, 2020 corresponding to application No. 201780038325.0.

* cited by examiner

| HOURLY REPORT | | |
|---|---|---|
| CLASS | TIME SEGMENT | FREQUENCY (NUMBER OF SHOTS) |
| 1 | 17-18 | 0 |
| 2 | 18-19 | 0 |
| 3 | 19-20 | 0 |
| 4 | 20-21 | 0 |
| 5 | 21-22 | 0 |
| 6 | 22-23 | 0 |
| 7 | 23-24 | 0 |
| 8 | 00-01 | 0 |
| 9 | 01-02 | 0 |
| 10 | 02-03 | 0 |
| 11 | 03-04 | 0 |
| 12 | 04-05 | 0 |
| 13 | 05-06 | 0 |
| 14 | 06-07 | 0 |
| 15 | 07-08 | 0 |
| 16 | 08-09 | 57 |
| 17 | 09-10 | 59 |
| 18 | 10-11 | 60 |
| 19 | 11-12 | 58 |
| 20 | 12-13 | 0 |
| 21 | 13-14 | 52 |
| 22 | 14-15 | 58 |
| 23 | 15-16 | 62 |
| 24 | 16-17 | 58 |
| 25 | 17-18 | 48 |
| 26 | 18-19 | 32 |
| 27 | 19-20 | 0 |
| 28 | 20-21 | 0 |
| 29 | 21-22 | 0 |
| 30 | 22-23 | 0 |
| 31 | 23-24 | 0 |
| 32 | 00-01 | 0 |
| 33 | 01-02 | 0 |
| 34 | 02-03 | 0 |
| 35 | 03-04 | 0 |
| 36 | 04-05 | 0 |
| 37 | 05-06 | 0 |
| 38 | 06-07 | 0 |
| 39 | 07-08 | 0 |
| 40 | 08-09 | 52 |
| 41 | 09-10 | 60 |
| 42 | 10-11 | 58 |
| 43 | 11-12 | 52 |
| 44 | 12-13 | 0 |
| 45 | 13-14 | 56 |
| 46 | 14-15 | 58 |
| 47 | 15-16 | 60 |
| 48 | 16-17 | 61 |

*FIG. 3*

| DAILY REPORT | | |
|---|---|---|
| CLASS | TIME SEGMENT | FREQUENCY (NUMBER OF SHOTS) |
| 1 | JANUARY 23 | 0 |
| 2 | JANUARY 24 | 0 |
| 3 | JANUARY 25 | 576 |
| 4 | JANUARY 26 | 480 |
| 5 | JANUARY 27 | 576 |
| 6 | JANUARY 28 | 384 |
| 7 | JANUARY 29 | 432 |
| 8 | JANUARY 30 | 0 |
| 9 | JANUARY 31 | 0 |
| 10 | FEBRUARY 1 | 512 |
| 11 | FEBRUARY 2 | 460 |
| 12 | FEBRUARY 3 | 449 |
| 13 | FEBRUARY 4 | 544 |
| 14 | FEBRUARY 5 | 457 |

*FIG. 4*

| WEEKLY REPORT | | |
| --- | --- | --- |
| CLASS | TIME SEGMENT | FREQUENCY (NUMBER OF SHOTS) |
| 1 | DECEMBER 14 TO DECEMBER 20 | 2640 |
| 2 | DECEMBER 21 TO DECEMBER 27 | 1800 |
| 3 | DECEMBER 28 TO JANUARY 3 | 0 |
| 4 | JANUARY 4 TO JANUARY 10 | 1008 |
| 5 | JANUARY 11 TO JANUARY 17 | 2640 |
| 6 | JANUARY 18 TO JANUARY 24 | 2160 |
| 7 | JANUARY 25 TO JANUARY 31 | 2448 |
| 8 | FEBRUARY 1 TO FEBRUARY 7 | 2422 |

*FIG. 5*

| MONTHLY REPORT | | |
| --- | --- | --- |
| CLASS | TIME SEGMENT | FREQUENCY (NUMBER OF SHOTS) |
| 1 | MARCH | 7562 |
| 2 | APRIL | 7680 |
| 3 | MAY | 8256 |
| 4 | JUNE | 8640 |
| 5 | JULY | 9408 |
| 6 | AUGUST | 9600 |
| 7 | SEPTEMBER | 10752 |
| 8 | OCTOBER | 10464 |
| 9 | NOVEMBER | 7872 |
| 10 | DECEMBER | 9216 |
| 11 | JANUARY | 9504 |
| 12 | FEBRUARY | 9024 |
| 13 | MARCH | 6720 |
| 14 | APRIL | 7680 |
| 15 | MAY | 8160 |
| 16 | JUNE | 9216 |
| 17 | JULY | 9312 |
| 18 | AUGUST | 9408 |
| 19 | SEPTEMBER | 9408 |
| 20 | OCTOBER | 10080 |
| 21 | NOVEMBER | 8832 |
| 22 | DECEMBER | 8256 |
| 23 | JANUARY | 8256 |
| 24 | FEBRUARY | 2422 |

*FIG. 6*

| YEARLY REPORT |||
|---|---|---|
| CLASS | TIME SEGMENT | FREQUENCY (NUMBER OF SHOTS) |
| 1 | YEAR 2010 | 0 |
| 2 | YEAR 2011 | 0 |
| 3 | YEAR 2012 | 57600 |
| 4 | YEAR 2013 | 113472 |
| 5 | YEAR 2014 | 118022 |
| 6 | YEAR 2015 | 107296 |
| 7 | YEAR 2016 | 18336 |
| 8 | | |
| 9 | | |
| 10 | | |
| 11 | | |
| 12 | | |
| 13 | | |
| 14 | | |
| 15 | | |
| 16 | | |
| 17 | | |
| 18 | | |
| 19 | | |
| 20 | | |

*FIG. 7*

| CLASS | TIME SEGMENT (OCCURRENCE INTERVAL) | | | | FRE-QUENCY |
|---|---|---|---|---|---|
| | MINUTE | HOUR | DAY | YEAR | |
| 1 | 1 | 0.0 | 0.0 | 0.0 | 18025 |
| 2 | 2 | 0.0 | 0.0 | 0.0 | |
| 3 | 4 | 0.1 | 0.0 | 0.0 | |
| 4 | 8 | 0.1 | 0.0 | 0.0 | |
| 5 | 16 | 0.3 | 0.0 | 0.0 | |
| 6 | 32 | 0.5 | 0.0 | 0.0 | |
| 7 | 64 | 1.1 | 0.0 | 0.0 | 30 |
| 8 | 128 | 2.1 | 0.1 | 0.0 | |
| 9 | 256 | 4.3 | 0.2 | 0.0 | |
| 10 | 512 | 8.5 | 0.4 | 0.0 | |
| 11 | 1024 | 17.1 | 0.7 | 0.0 | 24 |
| 12 | 2048 | 34.1 | 1.4 | 0.0 | |
| 13 | 4096 | 68.3 | 2.8 | 0.0 | 6 |
| 14 | 8192 | 136.5 | 5.7 | 0.0 | |
| 15 | 16384 | 273.1 | 11.4 | 0.0 | |
| 16 | 32768 | 546.1 | 22.8 | 0.1 | |
| 17 | 65536 | 1092.3 | 45.5 | 0.1 | |
| 18 | 131072 | 2184.5 | 91.0 | 0.2 | |
| 19 | 262144 | 4369.1 | 182.0 | 0.5 | |
| 20 | 524288 | 8738.1 | 364.1 | 1.0 | |
| 21 | 1048576 | 17476.3 | 728.2 | 2.0 | |
| 22 | 2097152 | 34952.5 | 1456.4 | 4.0 | |
| 23 | 4194304 | 69905.1 | 2912.7 | 8.0 | |
| 24 | 8388608 | 139810.1 | 5825.4 | 16.0 | |

*FIG. 12*

| CLASS | TIME SEGMENT (OCCURRENCE INTERVAL) | | | | FREQUENCY | TOTAL | SQUARE SUM |
|---|---|---|---|---|---|---|---|
| | MINUTE | HOUR | DAY | YEAR | | | |
| 1 | 1 | 0.0 | 0.0 | 0.0 | 18025 | 13818.75 | 7.2 |
| 2 | 2 | 0.0 | 0.0 | 0.0 | | | |
| 3 | 4 | 0.1 | 0.0 | 0.0 | | | |
| 4 | 8 | 0.1 | 0.0 | 0.0 | | | |
| 5 | 16 | 0.3 | 0.0 | 0.0 | | | |
| 6 | 32 | 0.5 | 0.0 | 0.0 | | | |
| 7 | 64 | 1.1 | 0.0 | 0.0 | 30 | 1350 | 725 |
| 8 | 128 | 2.1 | 0.1 | 0.0 | | | |
| 9 | 256 | 4.3 | 0.2 | 0.0 | | | |
| 10 | 512 | 8.5 | 0.4 | 0.0 | | | |
| 11 | 1024 | 17.1 | 0.7 | 0.0 | 24 | 17280 | 230000 |
| 12 | 2048 | 34.1 | 1.4 | 0.0 | | | |
| 13 | 4096 | 68.3 | 2.8 | 0.0 | 6 | 12960 | 18000 |
| 14 | 8192 | 136.5 | 5.7 | 0.0 | | | |
| 15 | 16384 | 273.1 | 11.4 | 0.0 | | | |
| 16 | 32768 | 546.1 | 22.8 | 0.1 | | | |
| 17 | 65536 | 1092.3 | 45.5 | 0.1 | | | |
| 18 | 131072 | 2184.5 | 91.0 | 0.2 | | | |
| 19 | 262144 | 4369.1 | 182.0 | 0.5 | | | |
| 20 | 524288 | 8738.1 | 364.1 | 1.0 | | | |
| 21 | 1048576 | 17476.3 | 728.2 | 2.0 | | | |
| 22 | 2097152 | 34952.5 | 1456.4 | 4.0 | | | |
| 23 | 4194304 | 69905.1 | 2912.7 | 8.0 | | | |
| 24 | 8388608 | 139810.1 | 5825.4 | 16.0 | | | |

*FIG. 14*

LOG COLLECTING DEVICE, INDUSTRIAL ROBOT, AND ELECTRIC-POWERED PRESS

This is a National Phase Application filed under 35 U.S.C. 371 as a national stage of PCT/JP2017/004817, filed Feb. 9, 2017, an application claiming the benefit of Japanese Application No. 2016-125894, filed Jun. 24, 2016, the content of which is hereby incorporated by reference in its entirety.

TECHNICAL FIELD

The present disclosure relates to a log collecting device that stores event logs, and an industrial robot and an electric-powered press including the log collecting device.

BACKGROUND ART

For maintenance personnel of industrial apparatus, such as an industrial robot and an electric-powered press, important concerns for specifying a maintenance time period or finding out an abnormality cause are the actuation status of said industrial apparatus. Simply, the maintenance personnel grasp the actuation status by asking a state of work. When the intent asking is not properly understood, when a laborer is unable to specify the information needed by the maintenance personnel, or when direct asking to the laborer is difficult, the asking would rather result in waste of time and work.

In addition to the asking, a scheme of constructing a structure which causes the industrial apparatus to create various kinds of event logs indicating the actuation statuses and to transmit the event logs to the maintenance personnel via a network can be considered (see, for example, Patent Documents 1). Although the information transmitted via the network contains many unnecessary information and the amount of information is excessive, since the necessary information surely reaches the maintenance personnel, the maintenance personnel do not have to rely on the asking. However, in view of security, there is a case in which the industrial apparatus is not always connected to the network.

When the industrial apparatus cannot be connected to the network, the event logs are accumulated in the industrial apparatus, and the event logs may be taken out from the industrial apparatus at a certain time cycle or when an abnormality occurs. Alternatively, the event logs may be transferred to a carrying-type memory medium, and the carrying-type memory medium may be mailed.

CITATION LIST

Patent Literatures

Patent Document 1: JP 2011-138309 A

SUMMARY OF INVENTION

Technical Problem

An enormous amount of events occurs at an industrial apparatus. That is, an industrial apparatus creates an enormous number of event logs. If the event logs are not output externally and are kept accumulated in the industrial apparatus, the following technical problems occurs in a memory that accumulates the event logs.

First, an example accumulation site of the event logs is a nonvolatile memory such as a flash memory. A nonvolatile memory is inexpensive, has a large capacity, and may accumulate an enormous number of event logs, but has a limit in the number of re-writing times. Taking an electric-powered press as an example of the industrial apparatus, if the event log of an execution completion created by 1 shot per a second is sequentially written in the memory, the number of re-writing times reaches the limit before a year elapses. Accordingly, the writing speed in the nonvolatile memory becomes extremely slow, and eventually, the nonvolatile memory becomes un-rewritable any more.

Moreover, another example accumulation site of the event logs is a volatile memory, such as an SRAM and an NVSRAM. If the volatile memory is adopted, the limit for the number of re-writing times can be eliminated. However, since the volatile memory has an expensive memory capacity unit price, the capacity is reduced purposefully and cannot accumulate an enormous number of event logs. Hence, selection of event logs to be accumulated is necessary, and when the selection of the event logs is improper, there is a possibility that useful information for the maintenance personnel is missing.

Accordingly, under the premise that the event logs cannot sequentially be output externally, for the reason that there is currently no appropriate memory, it is difficult to achieve the maintenance of an industrial apparatus by analysis of the event logs without relying on asking.

The present disclosure has been proposed in order to address the aforementioned technical problems of conventional technologies, and an objective is to provide a log collecting device that can grasp an actuation status based on event logs without a restriction regarding a memory.

Solution to Problem

In order to achieve the above objective, a log collecting device according to the present disclosure includes:

a volatile memory storing event logs indicating details of an event occurred at an apparatus;

a collection processing unit creating collection data that is a collection of the event logs; and a memory controlling unit storing the collection data in the volatile memory, and deleting the event logs collected as the collection data from the volatile memory.

The collection data may be a frequency distribution table that counts a number of occurrences of the event log for each time segment.

The collection processing unit may create a plurality of the collection data, and each of the collection data may have a class that contains a current time point, and a length of the time segment of the class may be different from the other collection data.

The plurality of collection data may be an hourly report that has the time segment of an hour, a daily report that has the time segment of a day, a weekly report that has the time segment of a week, a monthly report that has the time segment of a month, and a yearly report that has the time segment of a year.

Each of the collection data may only have the class that contains the current time point, except for the collection data that has the class configured by a longest time segment.

The collection processing unit may refer to the collection data that has the class with the short time segment, create the collection data that has the class with the long time segment, and the memory controlling unit may delete, the classes other than the class that contains the current time point from the collection data that has the class with the short time segment after the collection data that has the class with the long time segment is created.

The collection processing unit may create the collection data that have lengths of the time segments of the classes unequal.

The log collecting device may further include a nonvolatile memory, in which the memory controlling unit may store the event logs and the collection data in the volatile memory, and store the collection data in the nonvolatile memory when a back-up timing comes.

The back-up timing may be an occurrence of a specific event.

The log collecting device may further include an interface capable of reading out and writing in a portable memory medium, in which the memory controlling unit may store the event logs and the collection data in the volatile memory, and store the collection data in the portable memory medium when the portable memory medium is connected to the interface.

This log collecting device may be provided on an industrial apparatus, and may be provided on, for example, an industrial robot or an electric-powered press.

Advantageous Effects of Invention

According to the present disclosure, the actuation status can be grasped without relying on asking and without having a bottle neck with respect to a memory even if it is difficult to connect an industrial apparatus to a network.

BRIEF DESCRIPTION OF DRAWINGS

FIG. 3 is a schematic diagram illustrating an hourly report as collection data;

FIG. 4 is a schematic diagram illustrating a daily report as the collection data;

FIG. 5 is a schematic diagram illustrating a weekly report as the collection data;

FIG. 6 is a schematic diagram illustrating a monthly report as the collection data;

FIG. 7 is a schematic diagram illustrating a yearly report as the collection data;

FIG. 12 is a schematic diagram illustrating collection data according to a third embodiment;

FIG. 14 is a schematic diagram illustrating collection data according to a fourth embodiment;

DESCRIPTION OF EMBODIMENTS

First Embodiment

Figure 1:
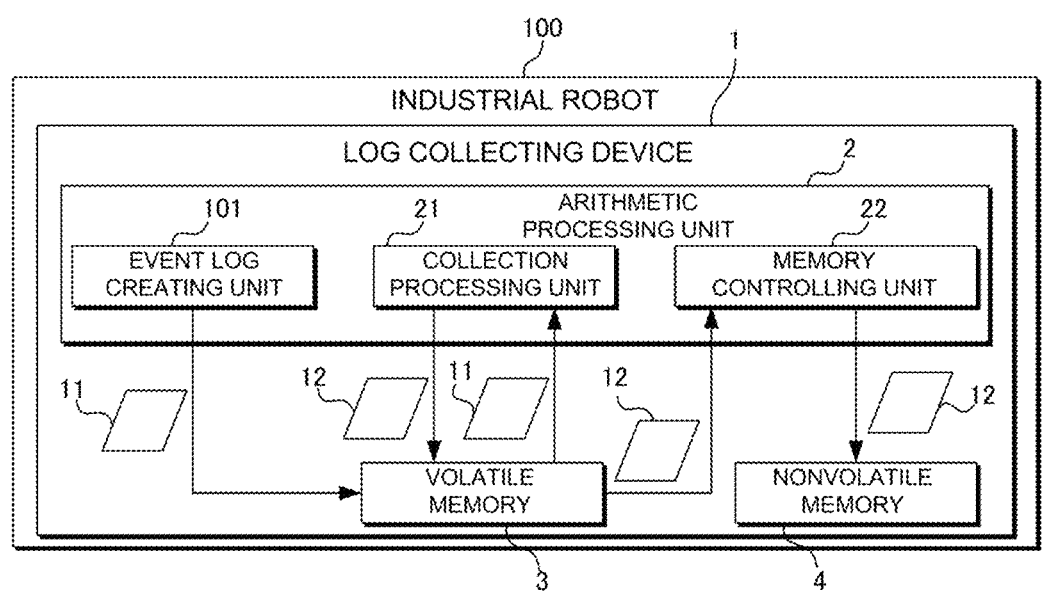
FIG. 1 is a block diagram illustrating a schematic structure of a log collecting device according to a first embodiment.

A log collecting device according to a first embodiment of the present disclosure will be described in detail with reference to the drawings. A log collecting device 1 illustrated in FIG. 1 is installed in an industrial apparatus 100, and collects event logs 11 created by an event log creating unit 101 of the industrial apparatus 100.

The event log 11 indicates the details of an event occurred at the industrial apparatus 100. The event log 11 contains an event ID and a time stamp as components. The event ID indicates the type of an event. Depending on the type of the event, the event ID is subdivided in accordance with the result of the event such as a success or failure. The time stamp indicates the occurrence time of an event. Depending on the type of the event, the event log 11 contains an observed value observed in the event.

The log collecting device 1 is provided on a computer or a microcomputer which control the industrial apparatus 100 and which serve as the event log creating unit 101, and includes an arithmetic processing unit 2, such as a CPU or an MPU, a volatile memory 3, and a nonvolatile memory 4. Moreover, the arithmetic processing unit 2 includes a collection processing unit 21 and a memory controlling unit 22.

An example volatile memory 3 is an SRAM or an NVSRAM, and maintains stored information by supplied power. An example nonvolatile memory 4 is a flash memory, and maintains stored information without power supply. The volatile memory 3 has a memory capacity unit price more expensive than the nonvolatile memory 4, but has no limit in the number of re-writing times. The nonvolatile memory 4 has the memory capacity unit price less expensive than the volatile memory 3, but has limit in the number of re-writing times.

The collection processing unit 21 creates collection data 12. The collection data 12 is statistical information obtained by collecting the event logs 11, and indicates the actuation status of the industrial apparatus 100. Typically, the collection data 12 is a frequency distribution table, and is created by counting the number of occurrences of a specific event per a time segment. Each time segment will be referred to as a class, and a counted value of each class will be referred to as a frequency. However, as long as the actuation status of the industrial apparatus 100 can be grasped, the collection data 12 is not limited to the frequency distribution table.

This collection processing unit 21 counts the number of occurrences of the predetermined event log 11 per a time segment at equal cycle, and updates the collection data 12 by a counted result. More specifically, the collection processing unit 21 refers to the event ID and determines whether or not the event log 11 is the target to be collected, and refers to the time stamp to decide the class to which the event log 11 belongs and counts up the frequency of the decided class.

The memory controlling unit 22 controls the storing and the deletion of the event log 11 and of the collection data 12. Firstly, the memory controlling unit 22 records the event log 11 in the volatile memory 3. Secondly, the volatile memory 3 first records the collection data 12. Thirdly, the event logs 11 collected as the collection data 12 is deleted from the volatile memory 3. Fourthly, the nonvolatile memory 4 makes a back-up of the collection data 12 stored in the volatile memory 3 at a predetermined timing.

The scheme of making a back-up may either be transferring of the collection data 12 or copying, and the collection data 12 may be left in the volatile memory 3. Moreover, in the nonvolatile memory 4, the collection data 12 may be updated or may be stored at a different site.

Figure 2:
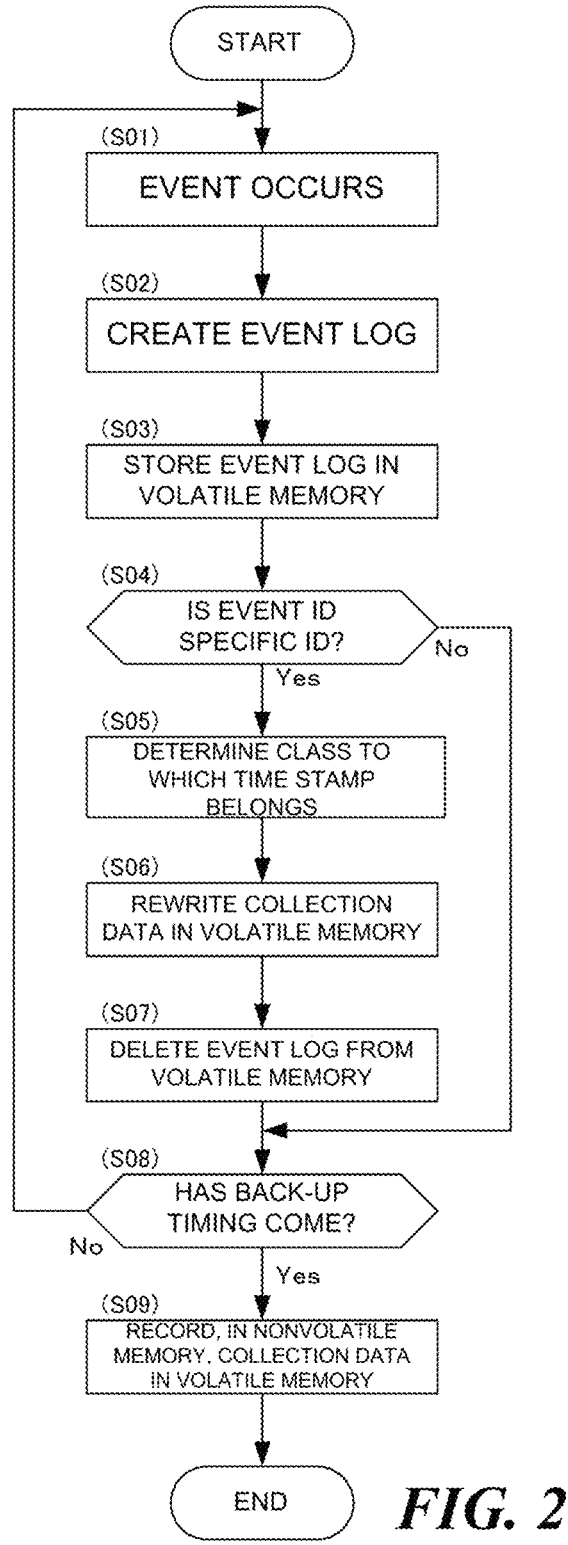
FIG. 2 is a flowchart illustrating an operation of the log collecting device according to the first embodiment.

FIG. 2 is a flowchart illustrating an example operation of this log collecting device 1. When an event occurs at the industrial apparatus 100 (step S01), the event log creating unit 101 creates the event log 11 (step S02). The memory controlling unit 22 records the event log 11 in the volatile memory 3 (step S03).

The collection processing unit 21 compares the event ID contained in the event log 11 with a specific ID that indicates the target to be collected (step S04). When the event ID is the specific ID (step S04: YES), the collection processing unit 21 determines the class to which the time stamp contained in the event log 11 belongs (step S05). After the class is determined, the collection processing unit 21 rewrites the collection data 12 in the volatile memory 3 to increment the frequency of the determined class by 1 (step S06).

In the step S04, the collection processing unit 21 has stored beforehand the specific ID indicating the target to be collected. In the step S05, as for the determination of the class, the collection processing unit 21 may compare the time segment indicated by each class that configures the collection data 12 with the time stamp of the event log 11 in the decision of the class, and may determine whether or not the time indicated by the time stamp falls within the time segment.

In the step S05, when the time stamp is newer than the time segment to which the newest class belongs, the collection processing unit 21 adds a new class to the collection data 12. Alternatively, when the collection processing unit 21 is not synchronized with the creation of the collection data 12 and the time segment to which the newest class belongs has past, the collection processing unit 21 creates a new class. When the updating timing of the collection data 12 is synchronized with the addition timing of the new class, the time stamp of the event log 11 would belong to the newest class even without the necessity of determination, and the determination of the class which the time stamp belongs to can be omitted.

In view of the memory capacity, the data amount of the collection data 12 may be designed unchanged, and the collection data 12 may be processed by FIFO (First In, First Out), and the oldest class may be deleted together with the addition of the new class.

After rewriting of the collection data 12 is completed, the memory controlling unit 22 deletes the event logs 11 collected as the collection data 12 from the volatile memory 3 (step S07). The log collecting device 1 repeats the steps S01 to S07. The memory controlling unit 22 waits for the arrival of a back-up timing during this repeat (step S08). When the back-up timing comes (step S08: YES), the memory controlling unit 22 stores, in the nonvolatile memory 4, the collection data 12 in the volatile memory 3 (step S09).

In the step S08, the back-up timing is, for example, periodical. The memory controlling unit 22 measures a certain time, and determines that the back-up timing comes at a time point at which the certain time elapses. Although the certain time period is not limited, it is appropriate if the certain time period has a length that is an integral multiple of the time segment to which the class belongs. However, in view of the memory capacity of the volatile memory 3 and the lifetime of the industrial apparatus 100, the certain time is set such that the volatile memory 3 would not saturated by the event logs 11 and do not exceed the limit of the number of rewriting times of the nonvolatile memory 4 within the lifetime.

A specific example of the collection data 12 created by this log collecting device 1 will be illustrated. As illustrated in FIG. 3, the collection data 12 is an hourly report. This collection data 12 contains the current time point in the newest class, and each class is equally divided hour by hour. Moreover, the event logs 11 for the latest 48 hours are counted for each time segment, and form this collection data 12.

The collection data 12 illustrated in FIG. 4 is a daily report. This collection data 12 contains the current time point in the newest class, and each class is equally divided day by day. The event logs 11 for the latest 14 days are counted for each time segment, and form this collection data 12.

The collection data 12 illustrated in FIG. 5 is a weekly report. This collection data 12 contains the current time point in the newest class, and each class is equally divided week by week. Moreover, the event logs 11 for the latest eight weeks are counted for each time segment, and form this collection data 12.

The collection data 12 illustrated in FIG. 6 is a monthly report. This collection data 12 contains the current time point in the class, and each class is equally divided month by month. Moreover, the event logs 11 for the latest 24 months are counted, and form this collection data 12.

The collection data 12 illustrated in FIG. 7 is a yearly report. This collection data 12 contains the current time point in the newest class, and each class is equally divided year by year. Moreover, the event logs 11 for the latest 20 years are counted, and form this collection data 12.

Figure 8:
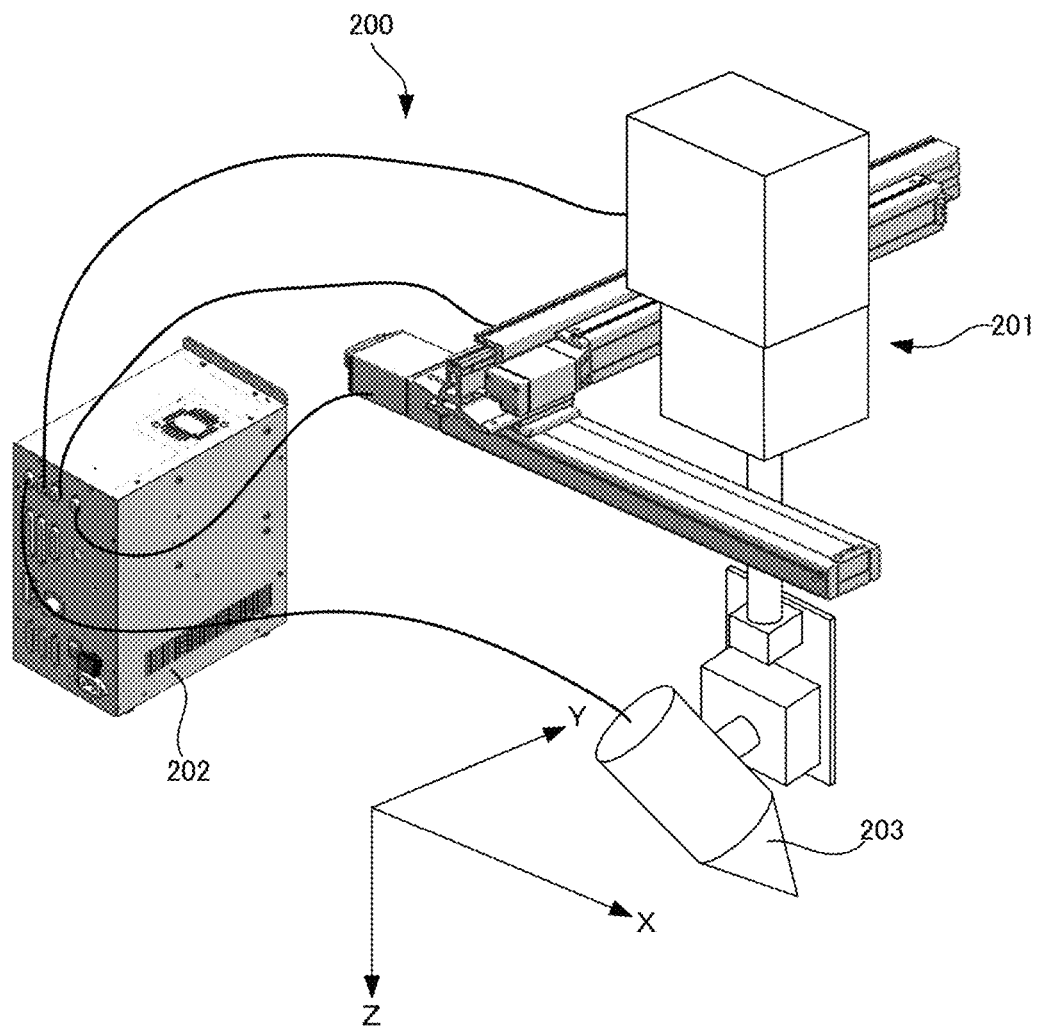
FIG. 8 is a perspective view illustrating a structure of a robot to which the log collecting device according to the first embodiment is applied.

A first example of the industrial apparatus 100 on which the log collecting device 1 is installed will be described. As illustrated in FIG. 8, the industrial apparatus 100 is an industrial robot 200. The industrial robot 200 includes moving means 201 and a controller 202. A work tool 203 is attached to the moving means 201. The industrial robot 200 executes a work at a desired position by the moving means 201 and the work tool 203.

The moving means 201 moves the work tool 203 in an X-axis direction, a Y-axis direction, and a Z-axis direction, and positions the work tool 203 at the desired position. The X-axis direction is an axial direction parallel to a horizontal plane. The Y-axis direction is another axial direction which is parallel to the horizontal plane and is orthogonal to the X-axis. The Z-axis direction is a height direction. The work tools 203 is an electric screw-fastening driver, a welder, a paint gun, or a handler, etc.

The controller 202 is a computer or a microcomputer which includes the arithmetic processing unit 2, the volatile memory 3, and the nonvolatile memory 4. Moreover, the controller 202 includes a motor driver that supplies power pulses to the moving means 201, a display unit such as a liquid crystal display, and manipulating means, such as a mouse, a keyboard, and a teaching pendant.

The controller 202 controls the moving means 201 and the work tool 203. Typically, the controller 202 moves the work tool 203 to the desired position under the control of the moving means 201, and controls the work tool 203 to work at the desired position. The controller 202 repeats the movement to the desired position and the work at the desired position, together with a change in desired position or a change in workpiece.

This controller 202 includes the event log creating unit 101 and the log collecting device 1. The event that occurs at the industrial robot 200 includes a work by the work tool 203. The event log creating unit 101 creates the event log 11 indicating completion of the work execution at the desired position by the work tool 203, or failure of the work execution for each work. The log collecting device 1 collects the event logs 11 indicating the completion of the work execution to the collection data 12 that is an hourly report, a daily report, a weekly report, a monthly report, or a yearly report that indicates the completion of the work execution for each time segment, and deletes the event logs 11 of the completion of the work execution from the volatile memory 3.

Figure 9:
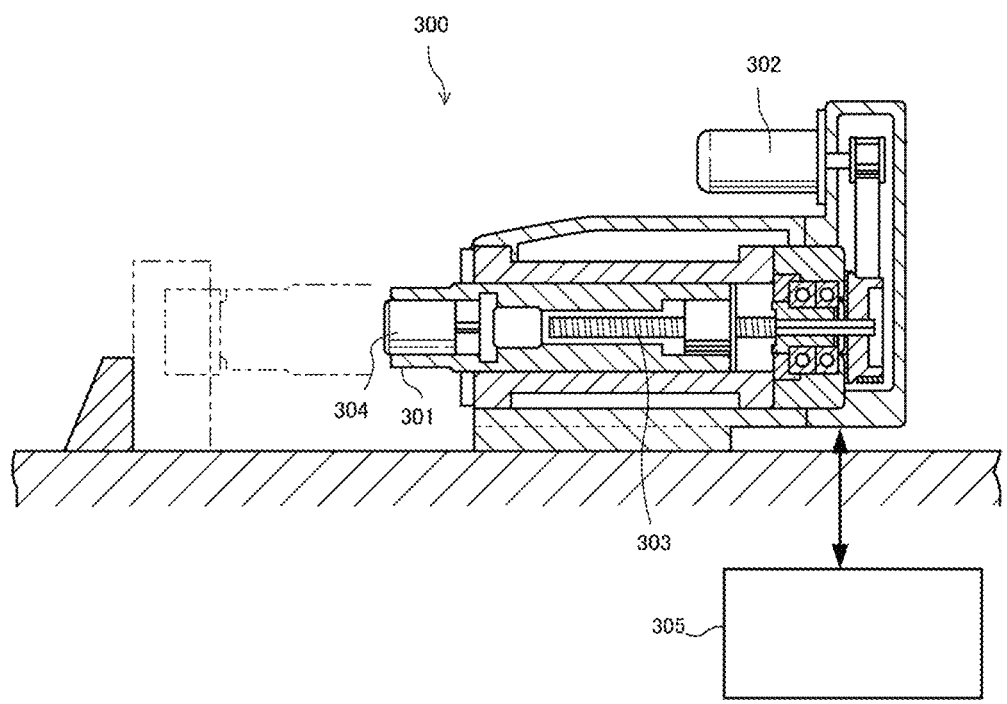
FIG. 9 is a cross-sectional view illustrating a structure of an electric-powered press to which the log collecting device according to the first embodiment is applied.

A second example of the industrial apparatus 100 on which the log collecting device 1 is installed will be described. As illustrated in FIG. 9, the industrial apparatus 100 is an electric-powered press 300. The electric-powered press 300 includes a ram 301 and an electric motor 302, and processes a workpiece by the pressure from the ram 301. Example processes to be performed on the workpiece are press fit and crimping. The driving force by the electric motor 302 is transmitted to the ram 301 via a ball screw 303. Provided at the tip of the ram 301 is a flexure element 304. The electric-powered press 300 applies load to the workpiece via the flexure element 304, and detects a load value to the workpiece via the flexure element 304.

The electric-powered press 300 includes a controller 305 connected to the electric motor 302 and to the flexure element 304 via signal lines. The controller 305 receives the load value to the workpiece from the flexure element 304, and controls the actuation of the electric motor 302 so that the load value to the workpiece becomes a desired value.

This controller 305 includes the event log creating unit 101 and the log collecting device 1. Example events which occur at the electric-powered press 300 are the execution of press work and the report of the load value. The event log creating unit 101 creates the event log 11 indicating the completion of press work execution or the failure of the press work execution, and the event log 11 indicating the report of the load value every time the workpiece is pressed. The log collecting device 1 collects the event logs 11 indicating the completion of the presswork execution to the collection data 12 that is an hourly report, a daily report, a weekly report, a monthly report, or a yearly report indicating the number of completions of press work execution, and deletes the event logs 11 indicating the completion of the press work execution from the volatile memory 3.

Here, the maintenance personnel of the industrial apparatus 100 grasps the actuation status from the feature indicated by a set of the event logs 11 rather than analyzing the event log 11 individually. For example, the feature of the actuation status, such as the number of occurrences of the event log 11 being zero in Saturday, Sunday and holidays, event log 11 not being occurred across a year in several years ago, and the event log 11 being occurred after several years have elapsed from the production, is found, and for example, a change in deterioration level based on the presence of a long-time deactivation period is evaluated.

Accordingly, for maintenance personnel, the exemplified actuation status can be grasped if the collection data 12 exist in the log collecting device 1. Moreover, presence of the collection data 12 in the log collecting device 1 enables deletion of the event logs 11 from the memory, and deletion of the event log 11 can address the technical problem that is a memory saturation even if the small-memory-capacity volatile memory 3 is applied to the log collecting device 1 the event logs 11 can be deleted from the memory if the collection data 12 exist in the log collecting device 1, and if the event logs 11 can be deleted, the technical problem of memory saturation does not occur even when the volatile memory 3 with small capacity is applied to the log collecting device 1.

For example, in the case of the collection data 12 that is an hourly report including classes for 48 hours, when the frequency of each class is configured by data of 4 bytes, it is appropriate if the memory area of 192 bytes is secured in the volatile memory 3. Even if 20 kinds of collection data 12 corresponding to 20 kinds of event logs 11 are stored, it is appropriate if the memory area of 3840 bytes is secured in the volatile memory 3.

Hence, this log collecting device 1 creates the collection data 12 that is a collection of the event logs 11, stores this collection data 12 in the volatile memory 3, and deletes the event logs 11 from the volatile memory 3. This enables to grasp the actuation status of the industrial apparatus 100 without relying on hearing even if the industrial apparatus 100 cannot be connected to a network, and without a restriction, such as a memory capacity and the number of rewritable times, being a problem. Furthermore, a statistical process can be eliminated from the work by the maintenance personnel, and a secondary effect such that quickness is given when grasping the actuation status of the industrial apparatus 100 is also achieved.

Moreover, this log collecting device 1 includes, in addition to the volatile memory 3, the nonvolatile memory 4. The memory controlling unit 22 stores the collection data 12 in the volatile memory 3, and stores the collection data 12 in the nonvolatile memory 4 when the back-up timing comes. Accordingly, even if the collection data 12 is lost from the volatile memory 3 due to suspension of power supply, the collection data 12 is still stored in the nonvolatile memory 4, and the reliability of the log collecting device 1 is improved.

Second Embodiment

A log collecting device 1 according to a second embodiment of the present disclosure will be described in detail with reference to the drawings. The same reference numeral will be given to the same structure and the same function as those of the first embodiment, and detailed description thereof will be omitted.

Figure 10:
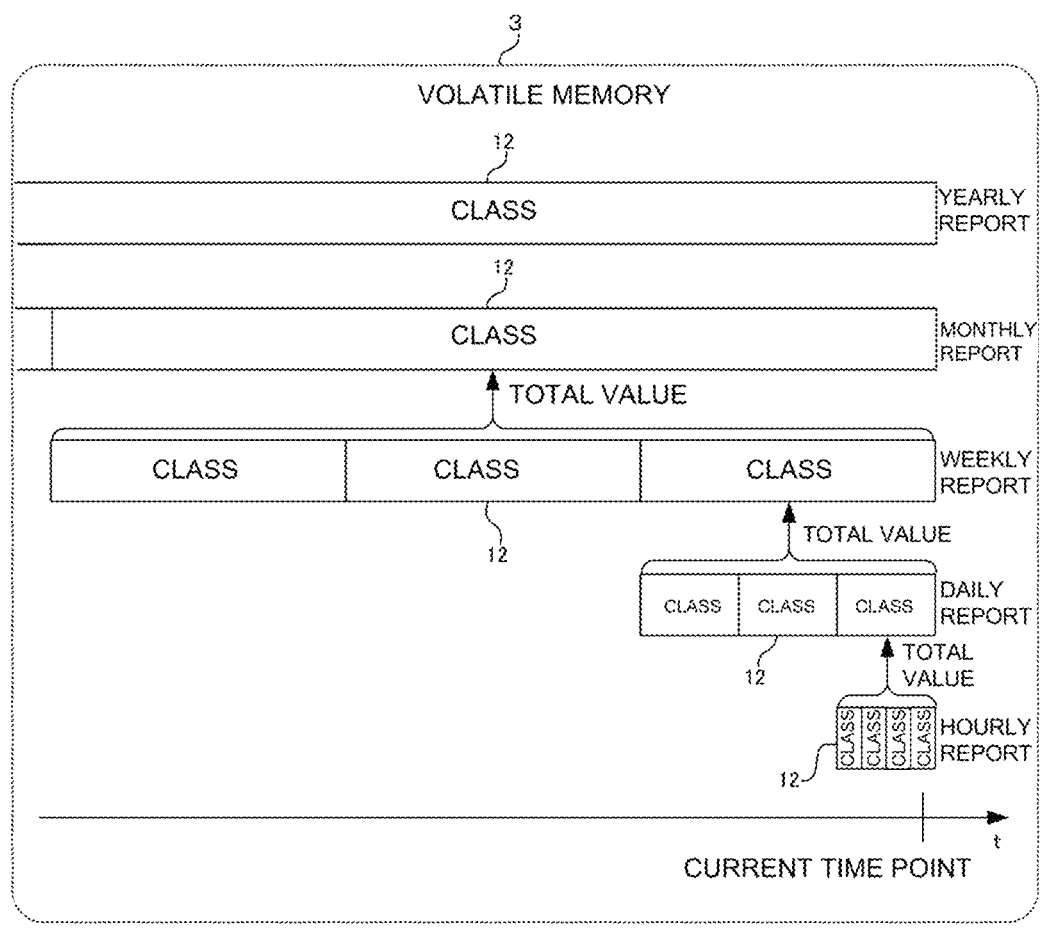
FIG. 10 is a schematic diagram illustrating collection data according to a second embodiment.

As illustrated in FIG. 10, the log collecting device 1 creates a plurality of collection data 12 simultaneously, and stores the plurality of collection data 12. Each collection data 12 is a frequency distribution table. Each collection data 12 has a class containing the current time point by interchanging the class applied for the FIFO process.

However, the time segment of the class that configures each data 12 differs from the time segment of the class that configures other data 12. Here, the collection data 12 configured by the class which has an n-th longer time segment will be referred to as n-th collection data 12, and the collection data 12 configured by the class which has an (n−1)-th longer time segment will be referred to as (n−1)-th collection data 12, and the n-th collection data 12 has the time segment of the class longer by integral multiple than that of the (n−1)-th collection data 12.

For example, the collection processing unit 21 creates the collection data 12 that is an hourly report divided hour by hour, the collection data 12 that is a daily report divided day by day, the collection data 12 that is a weekly report divided week by week, the collection data 12 that is a monthly report divided month by month, and the collection data 12 that is an yearly report divided year by year, and these collection data 12 are all stored.

The collection processing unit 21 refers to the collection data 12 that collects the event logs 11 by the class with a short time segment (in this embodiment, referred to as a short-term collection data 12 below), and creates the collection data 12 that collects the event logs 11 by the class with a long time segment (in this embodiment, referred to as a long-term collection data 12 below).

Figure 11:
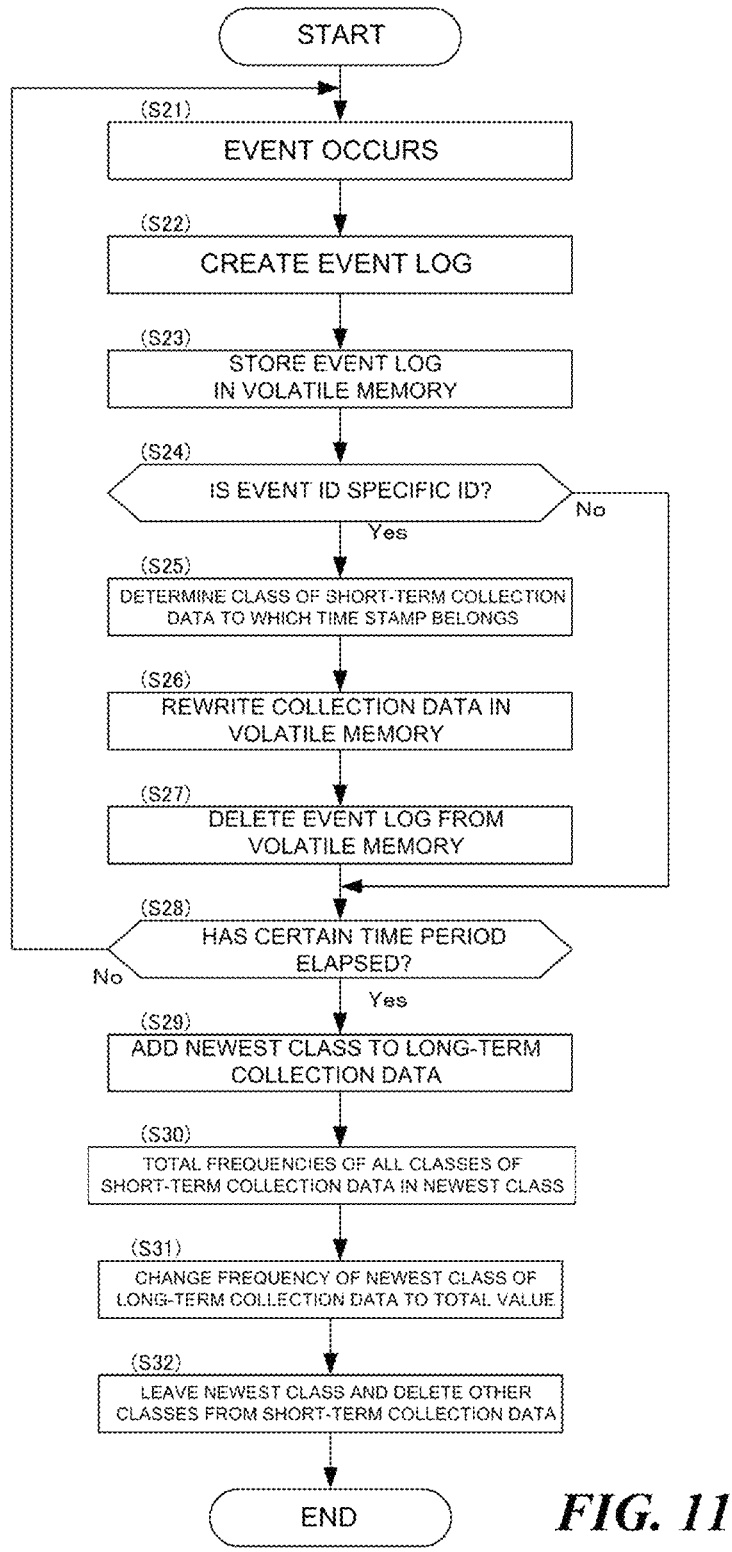
FIG. 11 is a flowchart illustrating an operation of a log collecting device according to the second embodiment.

FIG. 11 is a flowchart illustrating an operation of the log collecting device 1 which is mainly an operation of this collection processing unit 21. When an event occurs at the industrial apparatus 100 (step S21), the event log creating unit 101 creates the event log 11 (step S22). The memory controlling unit 22 stores the event log 11 in the volatile memory 3 (step S23).

The collection processing unit 21 determines whether or not the event ID of the event log 11 is the specific ID that indicates the target to be collected (step S24). When the event ID is the specific ID (step S24: YES), the collection processing unit 21 determines to which class of the short-term collection data 12 the time stamp belongs (step S25). After determining the class, the collection processing unit 21 rewrites the short-term collection data 12 to increment the frequency of the determined class by 1 (step S26). The memory controlling unit 22 deletes the event logs 11 collected as the short-term collection data 12 from the volatile memory 3 (step S27).

The collection processing unit 21 measures a certain time period (step S28). The certain time period is equal to or longer than at least the length of the class that configures the long-term collection data 12. When the certain time period elapses (step S28: YES), the collection processing unit 21 adds the newest class to the long-term collection data 12*b* (step S29). Next, the collection processing unit 21 adds the frequencies of all classes of the short-term collection data 12 which fall within this newest class (step S30), and writes a total value in the long-term collection data 12*b* as the frequency of the new class of the long-term collection data 12*b* (step S31).

The memory controlling unit 22 rewrites the short-term collection data 12 to keep the newest class and the frequency, but to delete the other classes and the frequencies from the short-term collection data 12 (step S32).

A specific example of the collection data 12 by this log collecting device 1 will be described. For example, the short-term collection data 12 is a daily report, and the long-term collection data 12 is a weekly report. The collection processing unit 21 collects the event log 11 for a day and create the short-term collection data 12 that is the daily report. The collection processing unit 21 updates the long-term collection data 12 week by week. The collection processing unit 21 adds all the frequencies of the classes for the latest seven days written in the short-term collection data 12. Next, the collection processing unit 21 creates the class of the newest week in the long-term collection data 12, and writes the total value in the class of the newest week.

Note that the short-term collection data 12 and the long-term collection data 12 are relative, and as illustrated in FIG. 10, the collection processing unit 21 may create a daily report from an hourly report, create a weekly report from a daily report, create a monthly report from a weekly report, and create a yearly report from a monthly report, and may accumulate all the hourly report, daily report, weekly report, monthly report, and yearly report. As for the relation between an hourly report and a daily report, the hourly report is the short-term collection data 12, and the daily report is the long-term collection data 12. As for the relation between a weekly report and a monthly report, the weekly report is the short-term collection data 12, and the monthly report is the long-term collection data 12.

The plurality of collection data 12 which have the class with different time segments becomes statistical information with higher information density when close to the current time point and becomes statistical information lower information density when far from the current time point. For example, the set of the collection data 12 has the number of occurrences of event for each hour for past 48 hours from current time point, the number of occurrences of event for each day for two weeks before the past 48 hours, the number of occurrences of event for each week for two months before the past two weeks, the number of occurrences of event for each month for 24 months before the past two months, and the number of occurrences of event for each year for 20 years before the past 24 months.

In the finding of the cause of the abnormality, it is preferable to grasp the detailed actuation status right before and after the occurrence of an abnormality and the tendency of the actuation status until the abnormality occurs. That is, in the finding of the cause of the abnormality, the set of the collection data 12, which has characteristics of higher information density when close to the current time point where the abnormality has occurred and lower information density when far from the current time point, has an information amount sufficient to find and grasp the cause of the abnormality, while being a small data amount that is not likely to saturate the volatile memory 3.

For example, when there is an actuation discontinued time period for the industrial apparatus 100, or there is a long time period before the start of the actuation of the industrial apparatus 100 after being sold, since the aged deterioration is considered, the number of operable times may decrease in comparison with a case in which the industrial apparatus has been continuously operated. These collection data 12 has no insufficiency for grasping such an actuation status. Moreover, when the frequency of each class is configured by the data amount of 4 byte, the collection data 12 that is an hourly report is 192 byte, the collection data 12 that is a daily report is 56 byte, the collection data 12 that is a weekly report is 32 byte, the collection data 12 that is a monthly report is 96 byte, and the collection data 12 that is a yearly report is 80 byte, it is appropriate if the volatile memory 3 has a memory capacity of 456 byte in total.

Hence, by creating the plurality of collection data 12 which has the class that contains the current time point and which have the class with a time segment that has a length different from that of the other collection data 12, the collection data 12 maintains the sufficient information amount with a small data amount. Therefore, even if the detailed actuation status of the industrial apparatus 100 can be grasped, a technical problem regarding a memory can be avoided.

In addition, regarding the accumulation, depending on the actuation status to be grasped, all or a combination of apart of an hourly report, a daily report, a weekly report, a monthly report, and a yearly report may be created and accumulated. Moreover, it is not always necessary that the time segment of the class that configures the collection data 12 is an hourly basis, a daily basis, a weekly basis, a monthly basis, and a yearly basis. For example, in the case of the industrial apparatus 100 that is activated in three shifts in 24 hours, it is appropriate if the collection data 12 configured of a class with a time segment that is eight hours is created and accumulated.

Moreover, regarding the short-term collection data 12, the newest class may be kept and other classes may be deleted. In this case, the other classes have the characteristics of information for creating the long-term collection data 12. The information deleted from the short-term collection data 12 can be compensated by the long-term collection data 12, enabling a further reduction of the necessary memory capacity.

For example, in the case of the collection data 12 that are an hourly report, a daily report, a weekly report, a monthly report, and a yearly report, after the creation of the long-term collection data 12 that has referred the short-term collection data 12 is completed, since each collection data 12 other than yearly report is 4 byte, and the yearly report for 20 years is 80 byte, it is appropriate if the volatile memory 3 has a memory capacity of 96 byte in total.

Moreover, in this embodiment, the long-term collection data 12 is created by referring to the short-term collection data 12. Not being limited to this case, when a specific event occurs, the frequency of the newest class which both the short-term collection data 12 and the long-term collection data 12 have may be counted up.

Third Embodiment

A log collecting device 1 according to a third embodiment of the present disclosure will be described in detail with reference to the drawings. The same reference numeral will be given to the same structure and the same function as those of the first or second embodiment, and the detailed description thereof will be omitted.

It is not necessary to equally divide the time segment of each class that configures the collection data 12 as long as it is suitable to indicate the actuation status of the industrial apparatus 100, and the scheme is not limited to the counting of the number of occurrences of event. As illustrated in FIG. 12, each class in the collection data 12 may have a time segment increased by the exponent of two. The time segment of each class indicates the occurrence interval of the event log 11. For example, in the case of the collection data 12 that has a two-minute interval and four-minute interval class, the number of occurrences of event logs 11 which exceeds two minutes and within four minutes is counted in the four-minute interval class.

Figure 13:
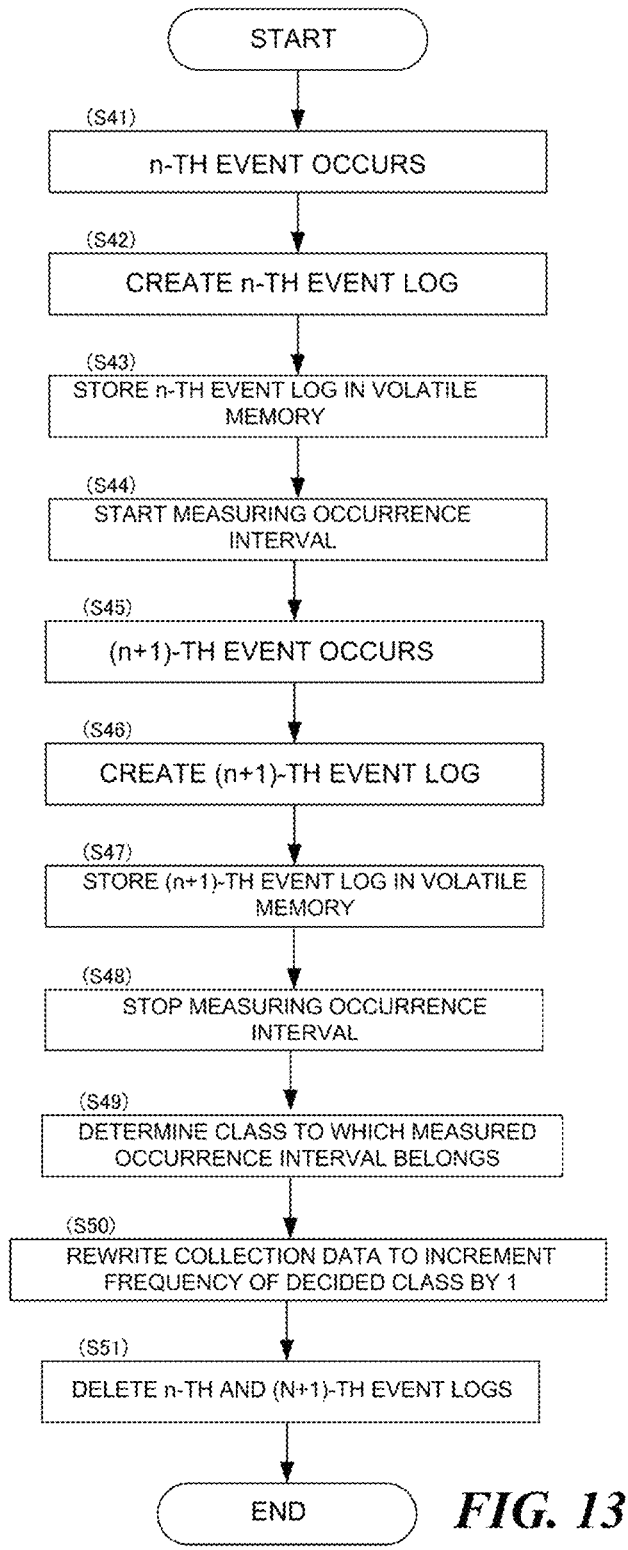
FIG. 13 is a flowchart illustrating an operation of the log collecting device according to the third embodiment.

FIG. 13 is a flowchart illustrating an operation of the log collecting device 1 which creates this collection data 12. When the n-th event occurs at the industrial apparatus 100 (step S41), the event log creating unit 101 creates the n-th event log 11 (step S42). The memory controlling unit 22 stores the n-th event log 11 in the volatile memory 3 (step S43). The collection processing unit 21 starts measuring the occurrence interval when the n-th event log 11 is created (step S44).

When an (n+1)-th event occurs at the industrial apparatus 100 (step S45), the event log creating unit 101 creates the (n+1)-th event log 11 (step S46). The memory controlling unit 22 stores the (n+1)-th event log 11 in the volatile memory 3 (step S47). The collection processing unit 21 stops measuring the occurrence interval (step S48).

The collection processing unit 21 determines the class to which the measured occurrence interval belongs (step S49). After the class is determined, the collection processing unit 21 rewrites the collection data 12 in the volatile memory 3 to increment the frequency of the determined class by 1 (step S50). Next, the memory controlling unit 22 deletes the n-th and the (n+1)-th event logs 11 collected as the collection data 12 from the volatile memory 3 (step S51). Note that as long as the occurrence interval can be measured, the deletion timing of the event log 11 is arbitrary.

As described above, in the log collecting device 1, the collection processing unit 21 creates the collection data 12, and this collection data 12 has the class each of which is non-equal, and contains each class which has a time segment with a different length. Each class has the different time segment increased by the exponent of two, and the frequency is counted for different event occurrence intervals.

The collection data 12 according to this example facilitates extraction of a unique occurrence interval, makes the presence of the actuation discontinued time period of the industrial apparatus 100 apparent, and also makes a fact such as the actuation being discontinued on Saturday, Sunday, and holidays apparent, improving the precise grasp of the actuation status of the industrial apparatus 100. Since one collection data 12 indicates a long-term tendency without the parallel creation of an hourly report, a daily report, and a weekly report, etc., the memory capacity installed in the log collecting device 1 can be further reduced.

Fourth Embodiment

A log collecting device 1 according to a fourth embodiment of the present disclosure will be described in detail with reference to the drawings. The same reference numeral will be given to the same structure and the same function as those of the third embodiment, and the detailed description thereof will be omitted.

As illustrated in FIG. 14, each class that configures a collection data 12 has a different length in comparison with other classes, and for example, each class has the time segment increased by the exponent of two. This time segment indicates the occurrence interval of the event log 11. Furthermore, each class records, in addition to the frequency, the sum of the occurrence intervals of the event logs 11, and the sum of squares of the occurrence interval of the event log 11.

Figure 15:
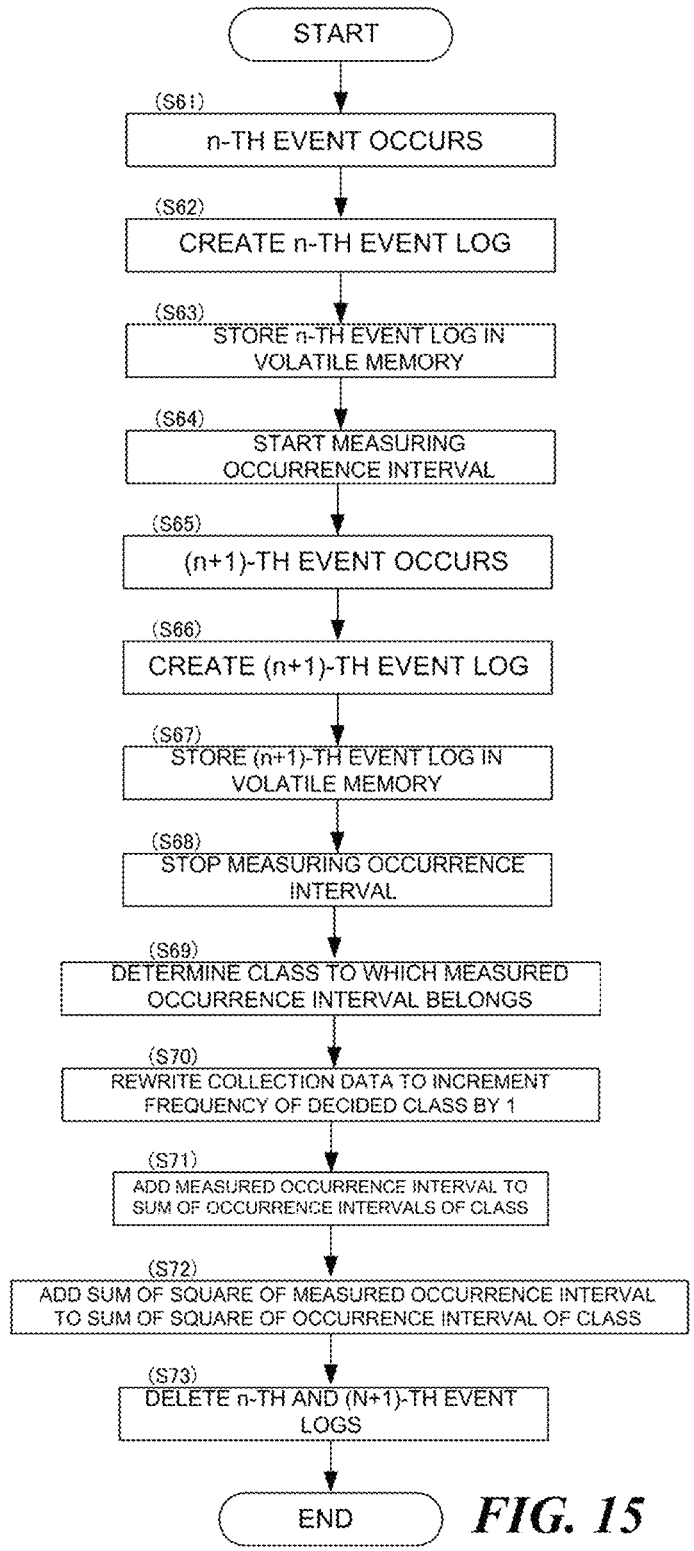
FIG. 15 is a flowchart illustrating an operation of a log collecting device according to the fourth embodiment.

FIG. 15 is a flowchart illustrating an operation of the log collecting device 1 which creates this collection data 12. When the n-th event occurs at the industrial apparatus 100 (step S61), the event log creating unit 101 creates the event log 11 (step S62). The memory controlling unit 22 stores the event log 11 in the volatile memory 3 (step S63). The collection processing unit 21 start measuring the occurrence interval when the n-th event log 11 is created (step S64).

Moreover, when the (n+1)-th event occurs at the industrial apparatus 100 (step S65), the event log creating unit 101 creates the event log 11 (step S66). The memory controlling unit 22 stores the event log 11 in the volatile memory 3 (step S67). The collection processing unit 21 stops measuring the occurrence interval (step S68).

The collection processing unit 21 determines the class to which the measured occurrence interval belongs (step S69). When the class is determined, the collection processing unit 21 rewrites the collection data 12 in the volatile memory 3 to increment the frequency of the determined class by 1 (step S70). Moreover, the collection processing unit 21 adds the measured occurrence interval to the sum of the occurrence intervals of the class (step S71). Furthermore, the collection processing unit 21 adds the sum of squares of the measured occurrence interval to the sum of squares of the occurrence interval of the class (step S72). The memory controlling unit 22 deletes the n-th and the (n+1)-th event logs 11 collected as the collection data 12 from the volatile memory 3 (step S73).

That is, the collection processing unit 21 adds the newly measured occurrence interval to the sum of the occurrence intervals recorded in the class to which the occurrence interval belongs when measuring the occurrence interval. Moreover, the collection processing unit 21 adds the value that is the square of this occurrence interval to the sum of squares of the occurrence interval recorded in the class to which the occurrence interval belongs when measuring the occurrence interval.

According to the collection data 12 of this example, the average value, the dispersion value, and the deviation of the occurrence intervals can be derived from the frequency for the occurrence intervals, the sum of the occurrence intervals, and the sum of squares of the occurrence interval, enabling a high analysis of the actuation status. Accordingly, the collection processing unit 21 can create the collection data 12 not only by the frequency distribution table, but also by various statistical schemes, and may not associate the class with frequency, or may associate calculation results that have parameters which are various numerical values recorded in the event logs 11 to the class in addition to associating the frequency to the class.

In the log collecting device 1 installed in the electric-powered press 300, the collection processing unit 21 may create a plurality of kinds of collection data 12 which have a class each containing the current time point and have different time segments for the class. A wear value of the ball screw 303 is recorded in each class. The wear value is an accumulation value of the multiplication values obtained by multiplying the actuation distance of the ram 301 by the load value to the workpiece. By referring to such collection data 12, a replacement cycle of the ball screw 303 can be calculated.

Fifth Embodiment

A log collecting device 1 according to a fifth embodiment of the present disclosure will be described in detail with reference to the drawings. The same reference numeral will be given to the same structure and the same function as those of the first to fourth embodiments, and the detailed description thereof will be omitted.

This log collecting device 1 records, in the nonvolatile memory 4, the collection data 12 in the volatile memory 3 by taking the occurrence of the specific event log 11 as a back-up timing. The specific event log 11 indicates the actuation error of the industrial apparatus 100, or contains an abnormal value in an observed value. When the industrial apparatus 100 is the robot 200 or the electric-powered press 300, the specific event log 11 indicates the failure of the work or the incompletion of the work by the work tool 203, or indicates the failure of the actuation or the incompletion of the actuation of the ram 301, or contains a load value that is abnormal.

Figure 16:
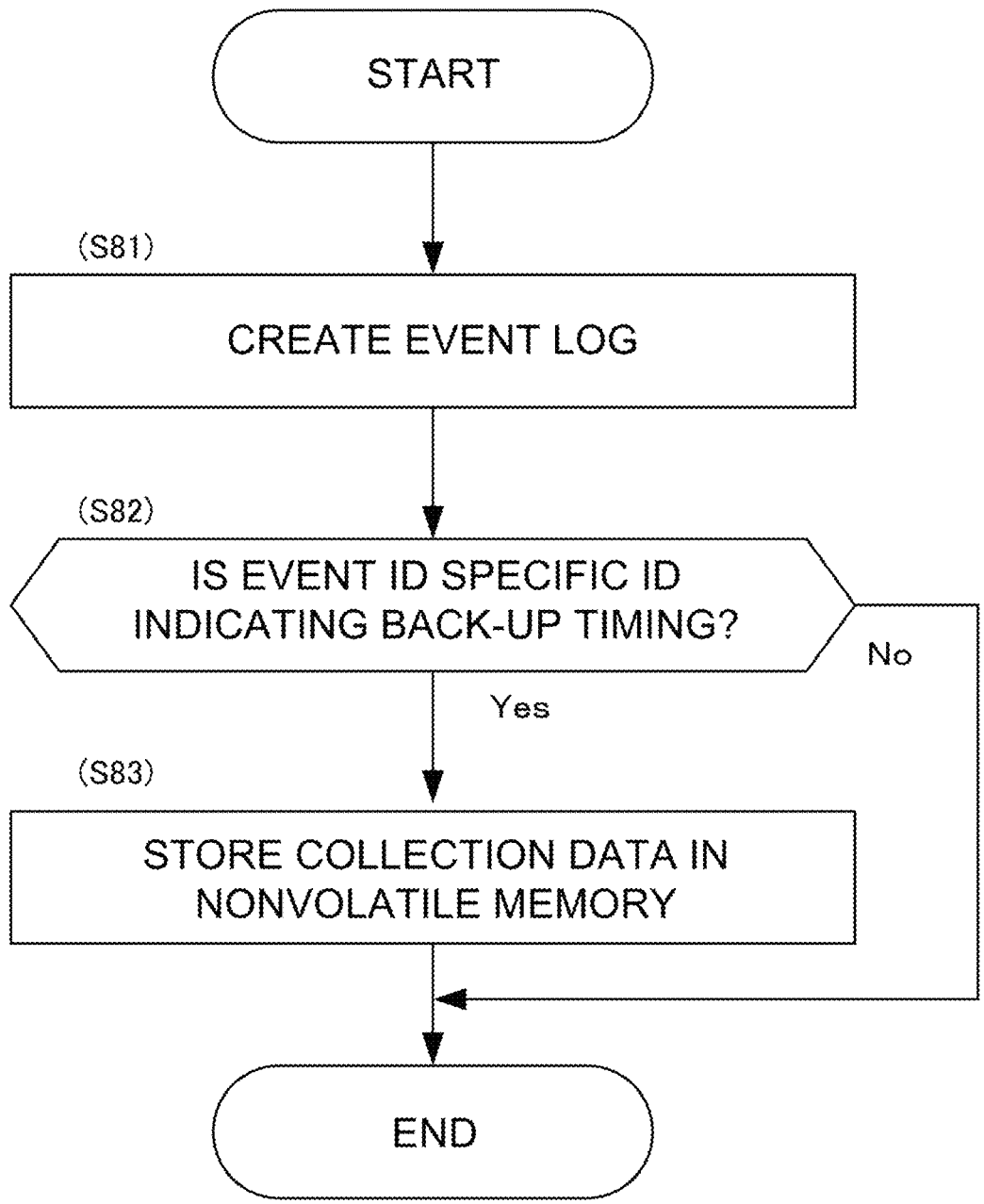
FIG. 16 is a flowchart illustrating a first example operation of a log collecting device according to a fifth embodiment.

FIG. 16 is a flowchart illustrating a first example operation of the memory controlling unit 22 according to this embodiment. When the event log 11 is created (step S81), the memory controlling unit 22 determines whether or not the event ID of the event log 11 is an event ID that specifies the back-up timing (step S82). When the event ID that indicates the back-up timing is contained in the event log 11 (step S82: YES), the memory controlling unit 22 stores, in the nonvolatile memory 4, the collection data 12 stored in the volatile memory 3 (step S83).

Figure 17:
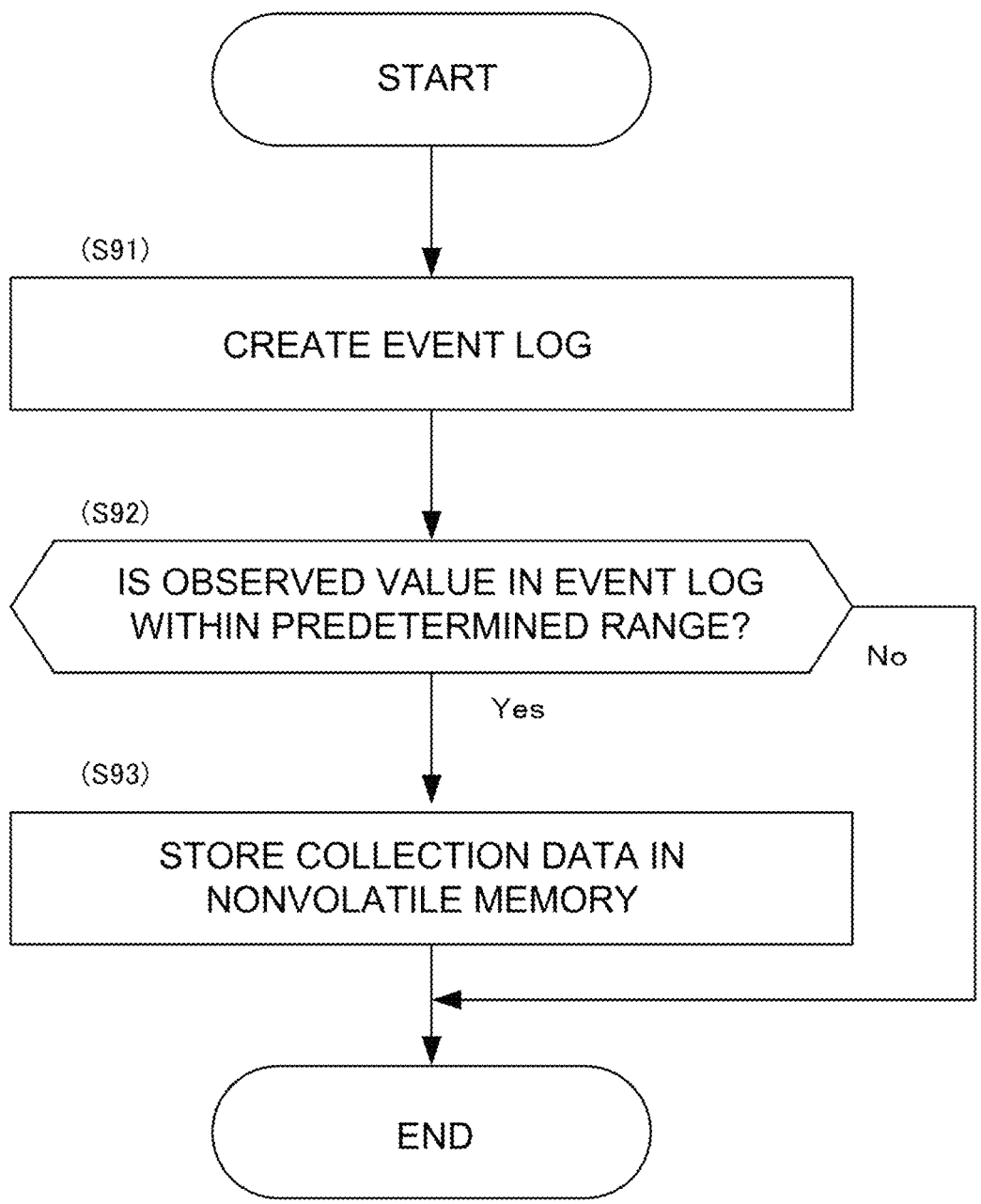
FIG. 17 is a flowchart illustrating a second example operation of the log collecting device according to the fifth embodiment.

FIG. 17 is a flowchart illustrating a second example operation of the memory controlling unit 22 according to this embodiment. When the event log 11 is created (step S91), the memory controlling unit 22 determines whether or not the observed value contained in the event log 11 is within a predetermined range (step S92). The memory controlling unit 22 stores information on the upper limit value and lower limit value of the predetermined range to be compared with the observed value beforehand. When the observed value is out of the predetermined range (step S92: YES), the memory controlling unit 22 stores, in the nonvolatile memory 4, the collection data 12 stored in the volatile memory 3 (step S93).

It is necessary to confirm and conserve the information indicating the past actuation status immediately before an occurrence of abnormality in order to find the cause of the occurrence of abnormality. The collection data 12 in which the event logs 11 after the occurrence of abnormality are considered contains noises that make the maintenance personnel to grasp the actuation status difficult. Since this log collecting device 1 records the collection data 12 in the nonvolatile memory 4 with the event log 11 indicating the occurrence of abnormality being a trigger, the collection data 12 stored in the nonvolatile memory 4 is sufficient to find the cause of the occurrence of abnormality, and indicates in high accuracy the actuation status that produced the cause of the occurrence of abnormality.

Therefore, with the occurrence of the event that indicates the occurrence of abnormality being the back-up timing, by storing the collection data 12 in the nonvolatile memory 4, the collection data 12 that enables accurate grasp of the actuation status of the industrial apparatus 100 can be kept in the nonvolatile memory 4.

Note that in order to grasp the actuation status that is a cause of the occurrence of the specific event, there is a case to confirm the details of the collection data 12 upon the occurrence of the specific event. Hence, in addition to the event that is the occurrence of abnormality, the collection data 12 may be recorded in the nonvolatile memory 4 upon various specific events.

Sixth Embodiment

A log collecting device 1 according to a sixth embodiment of the present disclosure will be described in detail with reference to the drawings. The same reference numeral will be given to the same structure and the same function as those of the first to fifth embodiments, and the detailed description thereof will be omitted.

Figure 18:
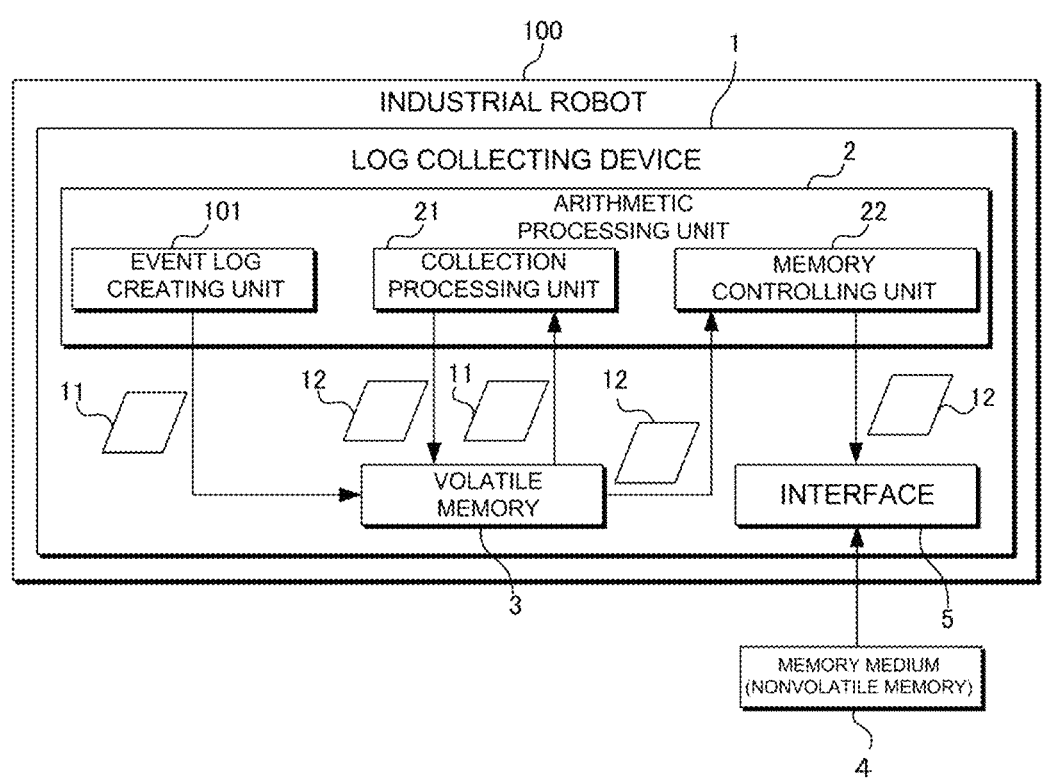
FIG. 18 is a block diagram illustrating a structure of a log collecting device according to a sixth embodiment.

As illustrated in FIG. 18, the log collecting device 1 includes an interface 5. The interface 5 is a port or a drive capable of writing in and reading out a portable memory medium, such as a USB storage, an SD card, or a CD-RAM. The nonvolatile memory 4 is not always provided on the log collecting device 1, but is a portable memory medium that is freely attachable and detachable. The memory controlling unit 22 takes the connection of the nonvolatile memory 4 that is the portable memory medium to the log collecting device 1 as a back-up timing, and stores the collection data 12 in the nonvolatile memory 4 that is the portable memory medium.

Figure 19:
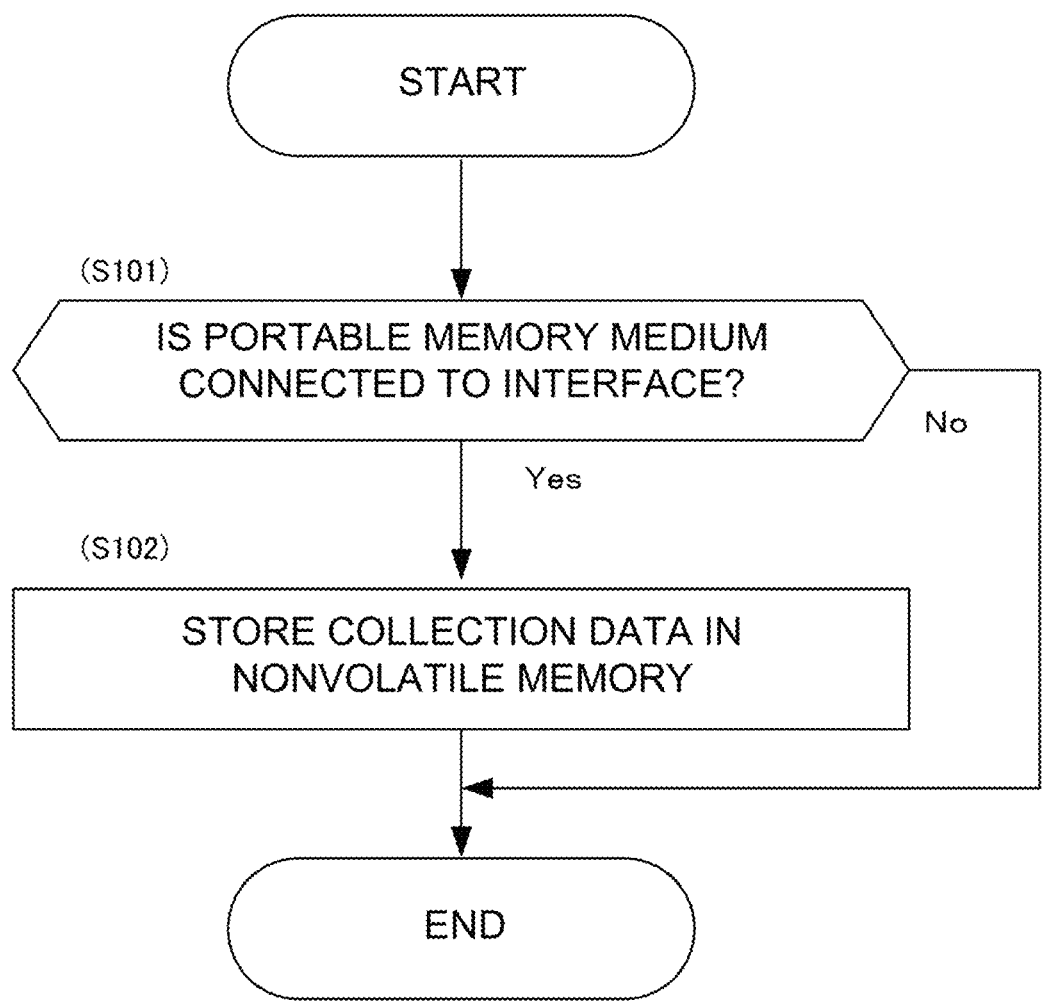
FIG. 19 is a flowchart illustrating an operation of the log collecting device according to the sixth embodiment.

FIG. 19 is a flowchart illustrating an example operation of the memory controlling unit 22 according to this embodiment. When the nonvolatile memory 4 that is the portable memory medium is connected to the interface 5 (step S101: YES), the memory controlling unit 22 stores, in the nonvolatile memory 4 connected to the log collecting device 1, the collection data 12 stored in the volatile memory 3 (step S102).

Before the abnormality detection by the industrial apparatus 100, a worker might detect an abnormality or a foretaste of the abnormality. For example, there is a case in which abnormal sounds is heard during the work, although the event log 11 that indicates the work completion failure is not created, or although the event log 11 that contains an abnormal value is not created. In this case, the collection data 12 that is truly useful to find the cause of the abnormality is the actuation status immediately before the abnormality detection by the worker, and such collection data 12 can be confirmed and conserved by a predetermined manipulation by the worker to the log collecting device 1 which is a connection of the portable memory medium by the worker.

The predetermined manipulation by the worker is not limited to the connection of the portable memory medium. However, when the connection of the portable memory medium is taken as the back-up timing, this also achieves a work of copying the collection data 12 to be given to the maintenance personnel, and a work effort can be reduced.

Other Embodiments

Although the embodiments of the present disclosure have been described above, various omissions, replacements and modifications can be made without departing from the scope of the present disclosure. Such embodiments and modified forms thereof are within the scope of the present disclosure, and also within the scope of the invention as recited in the appended claims and the equivalent range thereto.

REFERENCE SIGNS LIST

1 Log collecting device
11 Event log
12 Collection data
2 Arithmetic processing unit
21 Collection processing unit
22 Memory controlling unit
3 Volatile memory
4 Nonvolatile memory
5 Interface
100 Industrial apparatus
101 Event log creating unit
200 Industrial robot
201 Moving means
202 Controller
203 Work tool
300 Electric-powered press
301 Ram
302 Electric motor
303 Ball screw
304 flexure element
305 Controller

The invention claimed is:

1. A log collecting device comprising:
   a volatile memory storing event logs indicating details of an event occurred at an apparatus;
   a collection processing unit creating collection data comprising a plurality of frequency distribution tables that counts a number of occurrences of the event log for each time segment; and
   a memory controlling unit storing the plurality of frequency distribution tables in the volatile memory, and deleting the event logs collected as the plurality of frequency distribution tables from the volatile memory,
   wherein the collection processing unit creates each of the plurality of frequency distribution tables that has a length of the time segment of a class different from each other and only has the class that contains the current time point, except for the frequency distribution table that has the class configured by a longest time segment.

2. The log collecting device according to claim 1, wherein the plurality of collection data are an hourly report that has the time segment of an hour, a daily report that has the time segment of a day, a weekly report that has the time segment of a week, a monthly report that has the time segment of a month, and a yearly report that has the time segment of a year.

3. The log collecting device according to claim 1, wherein:
   the collection processing unit refers to collection data that has the class with the short time segment, and creates the collection data that has the class with the longest time segment; and
   the memory controlling unit deletes the classes other than the class that contains the current time point from the collection data that has the class with the short time segment after the collection data that has the class with the longest time segment is created.

4. The log collecting device according to claim 1, wherein the collection processing unit creates the collection data that have unequal lengths of the time segments of the classes.

5. The log collecting device according to claim 1, further comprising a nonvolatile memory,
   wherein the memory controlling unit stores the event logs and the collection data in the volatile memory, and stores the collection data in the nonvolatile memory when a back-up timing occurs.

6. The log collecting device according to claim 5, wherein the back-up timing is an occurrence of a specific event.

7. The log collecting device according to claim 1, further comprising an interface capable of reading out and writing in a portable memory medium,
   wherein the memory controlling unit stores the event logs and the collection data in the volatile memory, and stores the collection data in the portable memory medium when the portable memory medium is connected to the interface.

8. An industrial robot comprising the log collecting device according to claim 1.

9. An electric-powered press comprising the log collecting device according to claim 1.

* * * * *